United States Patent
Wang et al.

(10) Patent No.: US 9,906,572 B2
(45) Date of Patent: Feb. 27, 2018

(54) METHODS AND SYSTEMS FOR VIRTUAL CONFERENCE SYSTEM USING PERSONAL COMMUNICATION DEVICES

(71) Applicant: QUALCOMM Incorporated, San Diego, CA (US)

(72) Inventors: Song Wang, San Diego, CA (US); Sanghyun Chi, San Diego, CA (US); Arungundram Chandrasekaran Mahendran, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 14/820,371

(22) Filed: Aug. 6, 2015

(65) Prior Publication Data
US 2017/0041358 A1    Feb. 9, 2017

(51) Int. Cl.
*H04L 29/06* (2006.01)
*H04B 17/309* (2015.01)
(Continued)

(52) U.S. Cl.
CPC ......... *H04L 65/403* (2013.01); *H04B 17/309* (2015.01); *H04L 65/4015* (2013.01); *H04M 3/568* (2013.01); *H04W 4/06* (2013.01)

(58) Field of Classification Search
None
See application file for complete search history.

(56) References Cited

U.S. PATENT DOCUMENTS 6,580,793 B1 * 6/2003 Dunn .................. H04B 3/23
  370/352
6,751,187 B2 * 6/2004 Walton ................ H04L 1/0009
  370/210

(Continued)

FOREIGN PATENT DOCUMENTS

GB       2457254 A     8/2009
WO    2008043002 A2    4/2008
(Continued)

OTHER PUBLICATIONS

Vita J., et al., "Dynamic Adaptation of the Jitter Buffer for Video Streaming Applicants," IEEE 2nd Workshop on Advances in Information, Electronic and Electrical Engineering (AIEEE), Nov. 28, 2014, pp. 1-4, XP032729536, DOI: 10.1109/AIEEE.2014.7020318.

(Continued)

*Primary Examiner* — Ayaz Sheikh
*Assistant Examiner* — Faiyazkhan Ghafoerkhan
(74) *Attorney, Agent, or Firm* — Paradice and Li LLP

(57) ABSTRACT

Systems and methods are described herein for providing a virtual conference with a master device connected to a plurality of satellite devices, including: receiving, by the master device, uplink data packets from a plurality of channels, each of the plurality of channels is associated with one of the plurality of satellite devices, and dividing, by the master device, the plurality of channels into two or more groups based on a conversation captured in the uplink data packets of each of the plurality of channels. The master device selects one group from the two or more groups for output. The master device also transmits downlink data packets corresponding to the selected group for the plurality of satellite devices.

30 Claims, 11 Drawing Sheets

(51) Int. Cl.
*H04M 3/56* (2006.01)
*H04W 4/06* (2009.01)

(56) References Cited

U.S. PATENT DOCUMENTS

| | | | |
|---|---|---|---|
| 7,143,177 | B1 | 11/2006 | Johnson et al. |
| 7,166,062 | B1* | 1/2007 | Watterson .......... A63B 24/0084 482/1 |
| 7,551,647 | B2 | 6/2009 | Fellman et al. |
| 7,792,158 | B1 | 9/2010 | Cho et al. |
| 7,949,890 | B2* | 5/2011 | Vonog ...................... G06F 1/14 370/519 |
| 8,107,502 | B2 | 1/2012 | Darras et al. |
| 8,346,160 | B2 | 1/2013 | Kummetz |
| 8,391,320 | B2 | 3/2013 | Lubbs et al. |
| 8,422,409 | B2* | 4/2013 | Guo ........................ H04B 1/40 370/278 |
| 8,645,741 | B2 | 2/2014 | Vonog et al. |
| 8,873,543 | B2* | 10/2014 | Hua ........................ H04L 65/80 370/352 |
| 8,990,305 | B2 | 3/2015 | Barkley et al. |
| 9,094,564 | B2 | 7/2015 | Soldan |
| 9,203,633 | B2* | 12/2015 | Chu ........................ H04M 3/567 |
| 9,516,476 | B2* | 12/2016 | Milosevski ......... H04M 1/7253 |
| 2002/0103919 | A1 | 8/2002 | Hannaway |
| 2002/0163932 | A1 | 11/2002 | Fischer et al. |
| 2003/0053416 | A1 | 3/2003 | Ribas-Corbera et al. |
| 2004/0006595 | A1* | 1/2004 | Yeh .................. G06F 17/30899 709/204 |
| 2005/0058146 | A1 | 3/2005 | Liu et al. |
| 2005/0074061 | A1 | 4/2005 | Ribas-Corbera et al. |
| 2007/0021138 | A1 | 1/2007 | Allen et al. |
| 2007/0298823 | A1 | 12/2007 | Sherif et al. |
| 2008/0063216 | A1 | 3/2008 | Sakata et al. |
| 2008/0084900 | A1 | 4/2008 | Dunn |
| 2008/0162127 | A1* | 7/2008 | Laaksonen .............. H04M 3/56 704/225 |
| 2008/0177893 | A1 | 7/2008 | Bowra et al. |
| 2008/0181260 | A1* | 7/2008 | Vonog ...................... G06F 1/14 370/519 |
| 2008/0298266 | A1* | 12/2008 | Chang .................. H04B 17/336 370/252 |
| 2008/0298398 | A1 | 12/2008 | Eidson |
| 2008/0304653 | A1 | 12/2008 | Ghani et al. |
| 2009/0010228 | A1* | 1/2009 | Wang .................... H04B 1/7105 370/335 |
| 2010/0265834 | A1 | 10/2010 | Michaelis et al. |
| 2010/0323742 | A1 | 12/2010 | Allen et al. |
| 2011/0103377 | A1* | 5/2011 | Hua .................... H04L 65/1053 370/352 |
| 2011/0187813 | A1* | 8/2011 | Musgrave .............. H04L 12/66 348/14.09 |
| 2011/0200183 | A1* | 8/2011 | Erhart .................... H04M 3/568 379/202.01 |
| 2011/0258474 | A1 | 10/2011 | Vonog et al. |
| 2011/0262133 | A1 | 10/2011 | Yuan |
| 2012/0082067 | A1* | 4/2012 | Guo ........................ H04B 1/034 370/277 |
| 2012/0254649 | A1 | 10/2012 | Vonog et al. |
| 2012/0263195 | A1 | 10/2012 | Li et al. |
| 2012/0300769 | A1 | 11/2012 | Narbutt |
| 2012/0304079 | A1* | 11/2012 | Rideout .............. H04L 12/1818 715/758 |
| 2012/0314598 | A1 | 12/2012 | Sadek et al. |
| 2012/0327173 | A1* | 12/2012 | Couse ................. H04L 12/1822 348/14.03 |
| 2013/0002797 | A1 | 1/2013 | Thapa et al. |
| 2013/0106975 | A1* | 5/2013 | Chu ....................... H04M 3/567 348/14.01 |
| 2013/0165173 | A1 | 6/2013 | Allen et al. |
| 2013/0195276 | A1* | 8/2013 | Ojala .................... G10L 19/008 381/2 |
| 2013/0222519 | A1* | 8/2013 | Lee .......................... H04N 7/15 348/14.02 |
| 2014/0028498 | A1 | 1/2014 | Lin |
| 2014/0064165 | A1 | 3/2014 | Chung et al. |
| 2014/0111604 | A1 | 4/2014 | Vonog et al. |
| 2014/0156592 | A1* | 6/2014 | Bank ................ G06F 17/30345 707/609 |
| 2014/0164545 | A1 | 6/2014 | Davis et al. |
| 2014/0168354 | A1* | 6/2014 | Clavel ................... H04N 7/152 348/14.09 |
| 2014/0194059 | A1* | 7/2014 | Milosevski ......... H04M 1/7253 455/41.1 |
| 2014/0320698 | A1 | 10/2014 | Karivaradaswamy et al. |
| 2014/0323036 | A1 | 10/2014 | Daley et al. |
| 2014/0376545 | A1 | 12/2014 | Hua et al. |
| 2015/0050967 | A1 | 2/2015 | Bao et al. |
| 2015/0113403 | A1 | 4/2015 | Harvey et al. |
| 2015/0120953 | A1 | 4/2015 | Crowe et al. |
| 2015/0222677 | A1* | 8/2015 | Couse ................. H04L 12/1822 348/14.03 |
| 2015/0304607 | A1* | 10/2015 | Bader-Natal ........ H04L 65/1096 348/14.08 |
| 2016/0014373 | A1 | 1/2016 | Lafata et al. |
| 2016/0019376 | A1 | 1/2016 | Karaoguz et al. |
| 2016/0134428 | A1 | 5/2016 | Ouyang et al. |
| 2016/0142840 | A1 | 5/2016 | Das et al. |
| 2016/0205155 | A1* | 7/2016 | Rist ....................... H04M 3/567 709/205 |
| 2016/0302224 | A1 | 10/2016 | Khairmode et al. |
| 2017/0041252 | A1 | 2/2017 | Das |
| 2017/0041357 | A1 | 2/2017 | Wang |
| 2017/0041358 | A1* | 2/2017 | Wang ................... H04L 65/403 |

FOREIGN PATENT DOCUMENTS

| | | |
|---|---|---|
| WO | 2009139903 A1 | 11/2009 |
| WO | 2014043405 A1 | 3/2014 |
| WO | 2016077251 A1 | 5/2016 |

OTHER PUBLICATIONS

International Search Report and Written Opinion—PCT/US2016/041202—ISA/EPO—dated Oct. 11, 2016.

* cited by examiner

METHODS AND SYSTEMS FOR VIRTUAL CONFERENCE SYSTEM USING PERSONAL COMMUNICATION DEVICES

CROSS-REFERENCE TO RELATED PATENT APPLICATIONS

This application relates to U.S. application Ser. No. 14/820,363, titled METHODS AND SYSTEMS FOR VIRTUAL CONFERENCE SYSTEM USING PERSONAL COMMUNICATION DEVICES, filed on Aug. 6, 2015, which is incorporated herein by reference, in its entirety. This application also relates to U.S. application Ser. No. 14/820,421, titled METHODS AND SYSTEMS FOR VIRTUAL CONFERENCE SYSTEM USING PERSONAL COMMUNICATION DEVICES, filed on Aug. 6, 2015, which is incorporated herein by reference, in its entirety. This application relates to U.S. Provisional Application No. 62/156,841, titled AUDIO SIGNAL ADJUSTMENT FOR MOBILE PHONE BASED PUBLIC ADDRESSING SYSTEM, filed on May 4, 2015, which is incorporated herein by reference, in its entirety.

BACKGROUND

1. Field

Embodiments described herein generally relate to a Virtual Conference System (VCS). In particular, this disclosure relates to using personal communication devices (PCDs) as input and output devices for the VCS.

2. Background

A traditional conference system in a given venue may include at least one display screen, microphone, and speaker. The displaying screen displays visual output to attendees in the venue. The microphone captures audio data. The speaker outputs audio data to the attendees in the venue. Various issues confront the traditional conference system. For example, depending on where each attendee is positioned in the venue, some attendees may not be able to see the display screen, access the microphone, or hear the speaker, due to distance or view obstruction. Furthermore, unavailability of the traditional conference system (e.g., when the traditional conference system fails to function or when the traditional conference system is not present in the venue) can prevent the conference from occurring at that venue. Therefore, the traditional conference system may produce negative user experience in various situations.

SUMMARY

Various embodiments relate to a method for providing a virtual conference using a master device implemented with a personal communication device (PCD), including receiving, by the master device, uplink data packets from a plurality of channels, each of the plurality of channels is associated with one of the plurality of satellite devices, and dividing, by the master device, the plurality of channels into two or more groups based on a conversation captured in the uplink data packets of each of the plurality of channels. The master device selects one group from the two or more groups for output. The master device also transmits downlink data packets corresponding to the selected group for the plurality of satellite devices.

In some embodiments, each of the master device and the plurality of satellite devices is implemented with a PCD.

According to some embodiments, dividing the plurality of channels into two or more groups includes designating a first channel capturing a first conversation in a first group and designating a second channel capturing a second conversation in a second group.

In some embodiments, the method further includes determining whether two or more conversations are being captured in the plurality of channels.

In some embodiments, the determining whether two or more conversations are being captured in the plurality of channels includes receiving user input indicating whether two or more conversations are being captured.

In some embodiments, the dividing the plurality of channels into two or more groups includes dividing the plurality of channels based on physical locations of the satellite devices providing the plurality of channels.

In some embodiments, the physical locations of the satellite devices may be determined by receiving an indication from the satellite devices indicating the physical locations of the satellite devices.

In various embodiments, the master device divides the plurality of channels into two or more groups based on cross-correlation between the plurality of channels.

In some embodiments, each of the channels in a same group is cross-correlated with a reference channel at least above a predetermined threshold, the reference channel having the highest Signal-to-Noise Ratio (SNR) among the channels in the same group.

According to some embodiments, selecting the one group from the two or more groups for output includes receiving user input related to selecting the one group and selecting the one group based on the user input.

According to various embodiments, the method further includes selecting one channel from the selected one group and processing the uplink data packets in the selected channel, wherein the downlink data packets correspond to the processed uplink data packets in the selected channel.

In some embodiments, the channel is selected from the selected group based on SNR associated with all channels in the selected on group.

In various embodiments, the channel selected is a reference channel having the highest SNR among all the channels in the same group.

In some embodiments, the channel selected is currently selected. The channel is selected based on a current energy level and a hysteric energy level.

In some embodiments, the hysteric energy level is determined based on energy level of the channel selected over a predetermine time interval before a current time.

According to some embodiments, the selecting the channel based on the current energy level and the hysteric energy level includes determining a first channel selection parameter for the channel based on the current energy level and the hysteric energy level, determining a second channel selection parameter for other channels in the same group based on the current energy level. And selecting the channel based on a comparison between the first channel selection parameter and the second channel selection parameters.

In some embodiments, an impact of the hysteric energy level on the first channel selection parameter decreases exponentially or linearly over time.

According to some embodiments, the channel selected is currently selected. The channel is selected based on a current SNR level and a hysteric SNR level.

In some embodiments, the method further includes compensating, by the master device, sampling rate for echo cancellation for the selected channel before performing the echo cancellation.

In some embodiments, the method further includes determining, by the master device, at least one echo cancellation filter coefficient for the channel selected, storing, by the master device, the at least one echo cancellation filter coefficient, and applying the at least one echo cancellation filter coefficient for the channel selected when the channel selected is selected again.

In some embodiments, the method further includes determining, by the master device, echo cancellation capabilities for each of the plurality of satellite devices, performing, by the master device, echo cancellation for the selected channel, and transmitting the echo-cancelled downlink data packets to satellite devices incapable of performing echo cancellation.

In some embodiments, the method further includes transmitting the downlink data packets without echo cancellation to satellite devices capable of performing echo cancellation.

In some embodiments, the master device determines the echo cancellation capabilities for each of the plurality of satellite devices based on indications from each of the plurality of satellite devices concerning whether each of the plurality of satellite devices is capable of echo cancellation.

In some embodiments, a system is described for providing a virtual conference, the system including a processor configured to receive uplink data packets from a plurality of channels, each of the plurality of channels is associated with one of the plurality of satellite devices, divide the plurality of channels into two or more groups based on a conversation captured in the uplink data packets of each of the plurality of channels, select one group from the two or more groups for output, and transmit downlink data packets corresponding to the selected group.

In various embodiments, the process is further configured to: select one channel from the selected one group and process the uplink data packets in the selected channel, wherein the downlink data packets correspond to the processed uplink data packets in the selected channel.

In some embodiments, a system is described for providing a virtual conference, the system including means for receiving uplink data packets from a plurality of channels, each of the plurality of channels is associated with one of the plurality of satellite devices, means for dividing the plurality of channels into two or more groups based on a conversation captured in the uplink data packets of each of the plurality of channels, means for selecting one group from the two or more groups for output, and means for transmitting downlink data packets corresponding to the selected group.

In some embodiments, the method further includes means for selecting one channel from the selected one group and means for processing the uplink data packets in the selected channel, wherein the downlink data packets correspond to the processed uplink data packets in the selected channel.

In various embodiments, a non-transitory computer-readable medium having computer-readable instructions such that, when executed by a processor of a master device implemented with a PCD, cause the processor to perform a process for providing a virtual conference, including: receiving uplink data packets from a plurality of channels, each of the plurality of channels is associated with one of the plurality of satellite devices, dividing the plurality of channels into two or more groups based on a conversation captured in the uplink data packets of each of the plurality of channels, selecting, by the master device, one group from the two or more groups for output, and transmitting, by the master device, downlink data packets corresponding to the selected group.

In some embodiments, the process further includes select one channel from the selected one group, and process the uplink data packets in the selected channel, wherein the downlink data packets correspond to the processed uplink data packets in the selected channel.

In various embodiments, the channel is selected from the selected group based on SNR associated with all channels in the selected on group.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Figure 1:
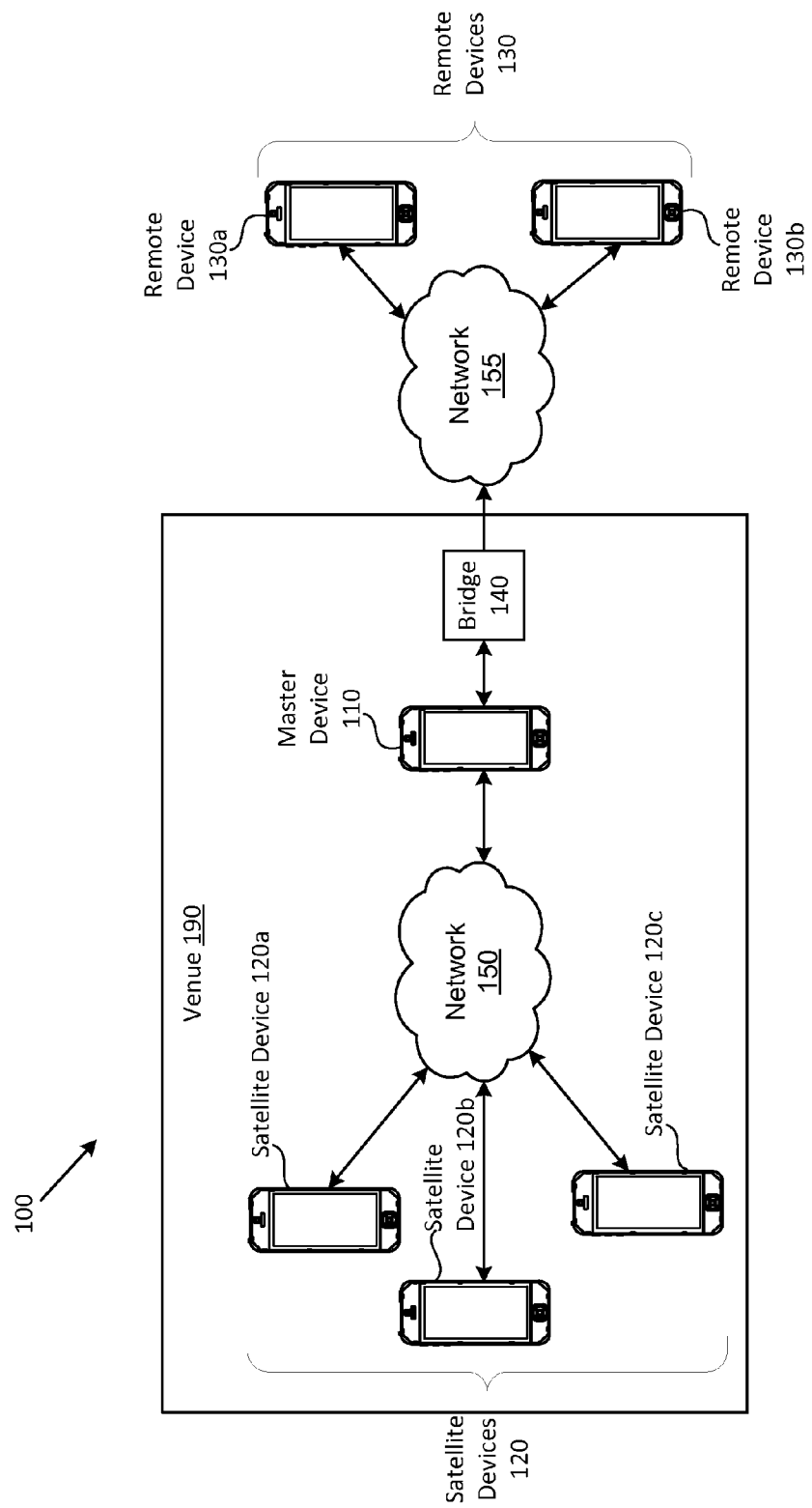
FIG. 1 is a diagram illustrating an example of a Virtual Conference System (VCS) according to various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Referring generally to the FIGS., a Virtual Conference System (VCS) may include satellite devices, remote devices, and a master device. Each of the satellite devices, remote devices, and master device may be implemented with a Personal Communication Device (PCD), such as, but not limited to, a mobile device, smartphone, and the like. The satellite device may be used for receiving and/or sending audio data with other users at a venue (e.g., a conference room or meeting site). For example, the satellite device may be used as a display, speaker, and microphone to achieve such purpose. The remote devices may be used similarly, but by users outside of the venue. The master device may receive audio/video data from satellite and/or remote devices. The master device may likewise capture audio/video data with its own microphone and camera. The master device may also relay (processed, mixed, filtered, and the like) audio/video data to the satellite devices and/or remote devices for outputting to the users of the satellite devices and the remote devices. The master device may centrally perform audio/video data processing functions such as mixing, reverberation control, channel selection, filtering, echo cancellation, buffer selection, and the like.

Accordingly, the VCS can be advantageous over any traditional conference system. In particular, given that PCDs are so pervasive, the conference can occur in any venue as long as the attendees/users have their PCDs with them. In addition, each attendee/user may closely perceive output data (e.g., visual data from the displays of the PCDs and audio data from the speaker of the PCDs). Therefore, the VCS as described herein can address the negative user experience of the traditional conference system, caused by an inability of the users to access audiovisual output or input.

Channel selection and mixing mechanisms may be implemented to account for the different microphone sensitivity and audio amplitude/phase discontinuity among the satellite devices, thus reducing or eliminating volume fluctuation and perceptible artifacts when a channel is switched. The channel with the best Signal-to-Noise Ratio (SNR) may be selected by the master device, with volume normalization applied before or after the SNR-based selection.

In other or further embodiments, the channel with the highest energy level may be selected. To prevent unnecessary switching, a hysteresis value may be determined for the selected channel based on the previous energy level and/or SNR level. Higher hysteresis value may mean higher energy/SNR level within a predetermined time interval before current time. Accordingly, the master device may selected the outputting channel based on the current energy and/or SNR level and the hysteresis value. Hysteresis value may decrease (linearly or exponentially) over time.

Within the venue and among the various satellite devices, two or more conversations (e.g., a main conversation and at least one side conversation). Two or more conversation may be identified by the master device based on correlation factors (with noise taken into account) calculated for the plurality of channels corresponding to the satellite devices. The master device may group the channels based on how closely correlate each channel is to the identified conversations. One conversation may be selected based on user input received by the master device or from one or more of the satellite devices. In some embodiments, signal processing (e.g., echo cancellation) for the channels corresponding to the selected conversation may be performed after the conversation has been selected. In other embodiments, the signal processing (e.g., echo cancellation) may be performed before the conversation has been selected.

Echo cancellation may be implemented to cancel output audio signals recaptured by a microphone of the satellite devices. When the master device switches from one channel to another channel for downlink, the master device may apply a saved echo cancellation filter coefficient for the newly selected channel, instead of resetting/reinitializing echo cancellation.

After channel selection is performed, the master device may perform echo cancellation (determining an echo delay) using normalized cross-correlation with a delayed reference signal sent to the downlink by the master device. Given that different clock speed of each satellite devices, the sample rates may be skewed. Therefore, sampling rate may be compensated before calculating the normalized cross-correlation. In some embodiments, echo cancellation may be performed by the master device only, the satellite device only, or both, depending on the satellite devices' capability to perform echo cancellation.

While various embodiments described herein may relate to audio data, one of ordinary skill in the art can appreciate that systems and methods described herein may be similarly implemented for video data.

FIG. 1 is a diagram illustrating an example of a VCS 100 according to various embodiments. Referring to FIG. 1, the VCS 100 may include of at least one satellite device (e.g., the satellite devices 120a-120c, collectively, the satellite devices 120), at least one remote device (e.g., the remote devices 130a-130b, collectively, the remote devices 130), and a master device 110. The master device 110 and the satellite devices 120 as well as the associated users may be physically located in a venue 190 (at least for the peer discovery process). For example, the master device 110 and the satellites devices 120 may be connected to the network 150 through a wireless access point that is physically located within the venue 190 (for the peer discovery process). The master device 110 may be coupled to or otherwise include a bridge 140. In some embodiments, the bridge 140 is physically located in the venue 190. In other embodiments, the bridge 140 is not physically located in the venue 190 but may be in communication with the master device 110.

In some embodiments, the master device 110 and the satellite devices 120 may be collected referred to as "near-end" devices. The remote devices 130 may be referred to as "far-end" devices. In such embodiments, the near-end devices may be centralized with respect to the master device 110. The master device 110 may connect to the virtual conference through the bridge 140, to which other parties (the far-end devices) may also be connected to. In addition, the far-end devices may also implement the master-satellite configuration of the near-end devices. For example, two or more master devices 110 may be connected to the bridge 140. Each of the master devices 110 may be connected to a separate group (i.e., in a separate venue 190) of satellite devices 120. In other embodiments, the master device 110 may also function as the bridge 140 and directly connected to the remote devices 130 via the network 155.

The satellite devices 120 and the master device 110 may be connected to one another through a network 150. The network 150 may be any wired or wireless network including, but not limited to, a WiFi network, Bluetooth network, Long Term Evolution (LTE) network (or other suitable types of mobile data network), a combination thereof, and/or the like. The remote devices 130 and the bridge 140 may be connected to one another through a network 155. The network 155 may be any wired or wireless network including, but not limited to, a WiFi network, Bluetooth network, LTE network (or other suitable types of mobile data network), a combination thereof, and/or the like. In some embodiments, the network 150 and the network 155 may be different networks. In other embodiments, the network 150 and the network 155 may be a same network. In some embodiments, the master device 110 and the bridge 140 may be connected to each other through the network 150. In other embodiments, the master device 110 and the bridge 140 may be connected to each other through the network 155 or another suitable network.

The venue 190 may be any suitable location that a conference can take place. For example, the venue 190 may refer to a meeting room, classroom, conference hall, lecture hall, and any suitable space in which a conference may be conducted. In addition, the venue 190 may be a space in which reverberation, howling, staggered sound, and the like may negatively impact the master device 110 and the satellite devices 120. The venue 190 may be occupied by at least the satellite devices 120, the master device 110, and their respective users (if any). The remote devices 130 (and their respective users), on the other hand, may be located anywhere outside of the boundaries of the venue 190. In particular, the users of the remote devices 130 may not be able to perceive output from the satellite devices 120.

Figure 2:
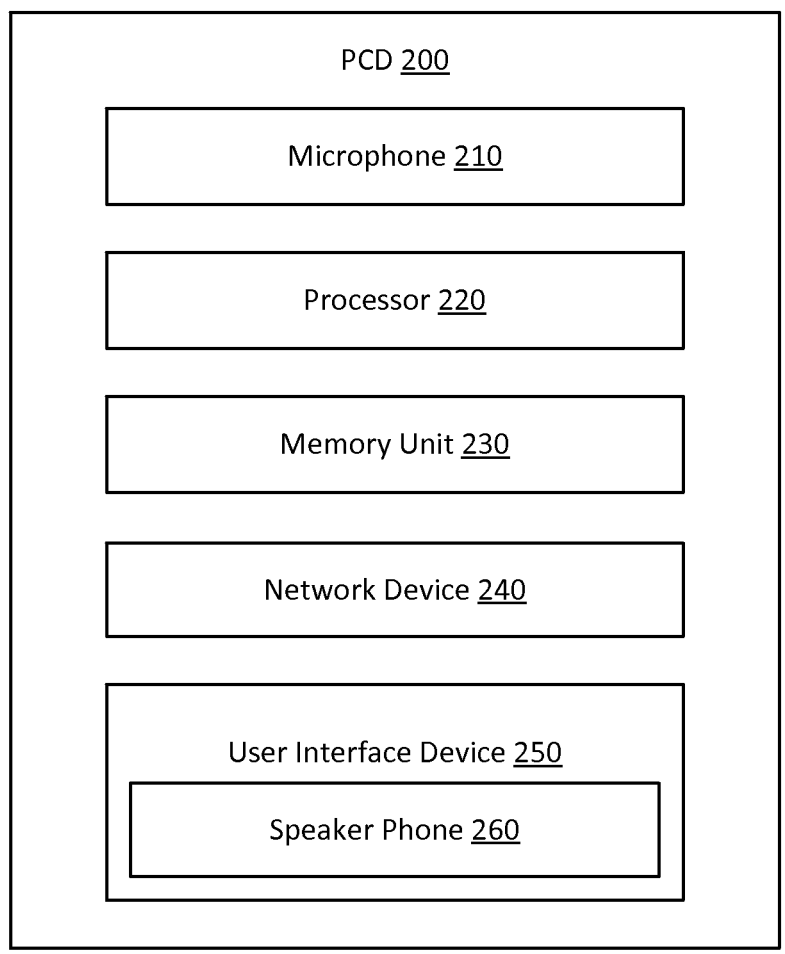
FIG. 2 is a block diagram illustrating an example of a Personal Communication Device (PCD) for implementation within the VCS according to various embodiments.

FIG. 2 is a block diagram illustrating an example of a PCD 200 for implementation in the VCS 100 according to various embodiments. Referring to FIGS. 1-2, one or more of the master device 110, satellite devices 120, and remote devices 120 may be implemented with the PCD 200. In particular embodiments, all of the master device 110, satellite devices 120, and remote devices 120 may be implemented with the PCD 200. The PCD 200 may be an electronic mobile device configured to capture and output audio data. In further embodiments, the PCD 200 may be configured to capture and output visual data (e.g., photographs, videos, and the like). Examples of the PCD 200 may include, but are not limited to, smartphones (mobile phones), pagers, tablets, PDAs, any mobile computing systems, and/or the like. The PCD 200 may be any mobile or non-mobile processor devices such as, but not limited to, a desktop computer, mainframe computer, laptop computer, and the like. The PCD 200 may include a microphone 210, processor 220, memory unit 230, network device 240, and a user interface device 250.

In some embodiments, the microphone 210 may be configured to capture sound from a user of the PCD 200 as the user speaks. In some embodiments, the microphone 210 may be integrated with the PCD 200 or otherwise housed inside of a housing of the PCD 200. In other embodiments, the at least one microphone 210 may be an auxiliary microphone not integrated with the PCD 200, but is operatively coupled to the PCD 200 in any suitable manner. The microphone 210 may capture Post Code Modulation (PCM) audio samples. Such PCM audio samples may be transmitted at uplink from the satellite devices 120 to the master device 110 through the network 150.

The processor 220 may be operatively coupled to the memory unit 230 for performing the functions of the PCD 200 described herein. For example, the processor 220 and the memory unit 230 may be configured to perform functions of the PCD 200 as described in the disclosure. The processor 220 may include any suitable data processing device, such as a general-purpose processor (e.g., a microprocessor). In the alternative, the processor 220 may be any conventional processor, controller, microcontroller, or state machine. The processor 220 may also be implemented as a combination of computing devices, e.g., a combination of a Digital Signal Processor (DSP) and a microprocessor, a plurality of microprocessors, at least one microprocessors in conjunction with a DSP core, or any other such configuration.

The memory unit 230 may be operatively coupled to the processor 220 and may include any suitable device for storing software and data for controlling and use by the processor 220 to perform operations and functions described herein, including, but not limited to, Random Access Memory (RAM), Read Only Memory (ROM), floppy disks, hard disks, dongles, or other Recomp Sensor Board (RSB) connected memory devices, or the like.

The network device 240 may include interface software and hardware for accessing the network 150 and/or the network 155 such that data may be transmitted and received via the network 150 and/or the network 155. The network device 240 may include at least one wireless receiver, transmitter, transceiver, and/or the like. The network device 240 may also include software providing a wireless or wireless communication link with the network 130.

The user interface 250 may include a display device and a user input device. The display device may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, or the like. In particular embodiments, the display device of the user interface 250 may include a speaker (e.g., a speaker phone 260) for outputting sound and a display screen for outputting visual data.

The user input device may include any suitable device that may receive input from a user including, but not limited to one or more manual operator (such as, but not limited to a switch, button, touchscreen, knob, slider or the like), camera, image sensor, Radio Frequency Identification (RFID) tag reader, or the like. In particular embodiments, the user input device of the user interface 250 may include the camera for capturing visual data.

The PCD 200 may have existing hardware and software for telephone and other typical wireless telephone operations, as well as additional hardware and software for providing functions as described herein. Such existing hardware and software includes, for example, one or more input devices (such as, but not limited to keyboards, buttons, touchscreens, cameras, microphones, environmental parameter or condition sensors), display devices (such as, but not limited to electronic display screens, lamps or other light emitting devices, speakers or other audio output devices), telephone and other network communication electronics and software, processing electronics, electronic storage devices and one or more antennae and receiving electronics for receiving various signals, e.g., for global positioning system (GPS) communication, WiFi communication, code division multiple access (CDMA) communication, time division multiple access (TDMA), frequency division multiple access (FDMA), LTE communication, frequency modulation (FM) communication, BT communication, near field communication (NFC), and the like. In such embodiments, some of that existing electronics hardware and software may also be used in the systems and processes for functions as described herein.

Accordingly, such embodiments can be implemented with minimal additional hardware costs. However, other embodiments relate to systems and process that are implemented with dedicated device hardware specifically configured for performing operations described herein. Hardware and/or software for the functions may be incorporated in the PCD 200 during manufacturing, for example, as part of the original manufacturer's configuration of the PCD 200. In further embodiments, such hardware and/or software may be added to the PCD 200, after original manufacturing, such as by, but not limited to, installing one or more software applications onto the PCD 200.

With respect to users of the satellite devices 120, audio may find its way into ears of the users of the satellite devices 120 in two paths: (1) a first path from the speaker's mouth directly into the user's ears, and (2) a second path from the speaker's mouth to the satellite device 120a, then through the network 150 to another satellite device 120b, which may output the audio data through the speakers to the user. This may cause reverberation or echo-like phenomenon that negatively impact user experience. In addition, howling may also be caused by the two different audio paths. In various embodiments, the master device 110 may transmit signals to specific ones of the satellite devices 120. The receiving satellite devices 120 may be physically isolated from a source signal (e.g., the speaker other sound sources, the source satellite device such as the satellite device 120a, and the like).

The master device 110 may be configured to receive audio and/or visual data from the satellite devices 120. The master device 110 may select one of the satellite devices 120 for output. The master device 110 may also mix outputs from two or more of the satellite devices 120 for output. The selected and/or mixed channels may be outputted to the satellite devices 120 by the master device 110. In some embodiments, signals obtained from a selected satellite device may not be played back at the same selected satellite device. In other words, when a satellite device is selected by the master device 110, that satellite device does not play back the signals that it captured. The master device 110 may transmit an indication to the originating satellite device indicating that output data is not to be outputted. This can suppress echo-like output and howling at the selected satellite device. In other embodiments, when signals obtained from the selected satellite device may be played back at the same selected satellite device or the rest of the satellite devices 120 when the selected satellite device is acoustically isolated from the signal source (e.g., the speaker). Generally, uplink data may be sent from the satellite devices 120 to master device 110, which then sends such data to the remote devices 130. Downlink data (originating from the remote devices 130) may be sent from the master device 110 to the satellite devices 120. In additional embodiments, downlink data may also refer to data originating from a selected one of the satellite devices 120 sent to the master device 110 (at uplink).

The VCS 100 may be configured for (1) obtaining time offset for each of the satellite devices 120 and the remote devices 130 with respect to the master device, (2) obtaining uplink and downlink delays for each of the satellite devices 120 and the remote devices 130, (3) synchronizing signals at uplink, and (4) synchronizing signals at downlink.

Given the complexity and the processing power of the PCD 200 as compared to simple microphone, speaker, and display in the traditional conferencing system, various aspects of a virtual conference may benefit from usage of the PCDs 200 and the master-satellite configuration. For example, as multiple satellite devices 120 may be present in the venue 190, the satellite device having the best audio quality (e.g., measured based on a signal-to-noise ratio (SNR) or the like) may be selected as the channel to be outputted to the other satellite devices 120 and the remote devices 130 at downlink. In some embodiments, the master device 110 may perform dual functions of the master device 110 and the satellite devices 120. In other embodiments, the master device 110 may perform purely signal processing functions and may not capture/output data.

Accordingly, the master device 110 may be a digital signal processing center for the near-end devices. In other words, the master device 110 may provide an interface for the satellite devices 120 with the bridge 140 (in turn, the remote devices 130). For the near-end devices, the bridge 140 may only need to interface with the master device 110 while still benefit from advantages of using the satellite devices 120 (the PCDs 200) as microphone and/or display.

Figure 3:
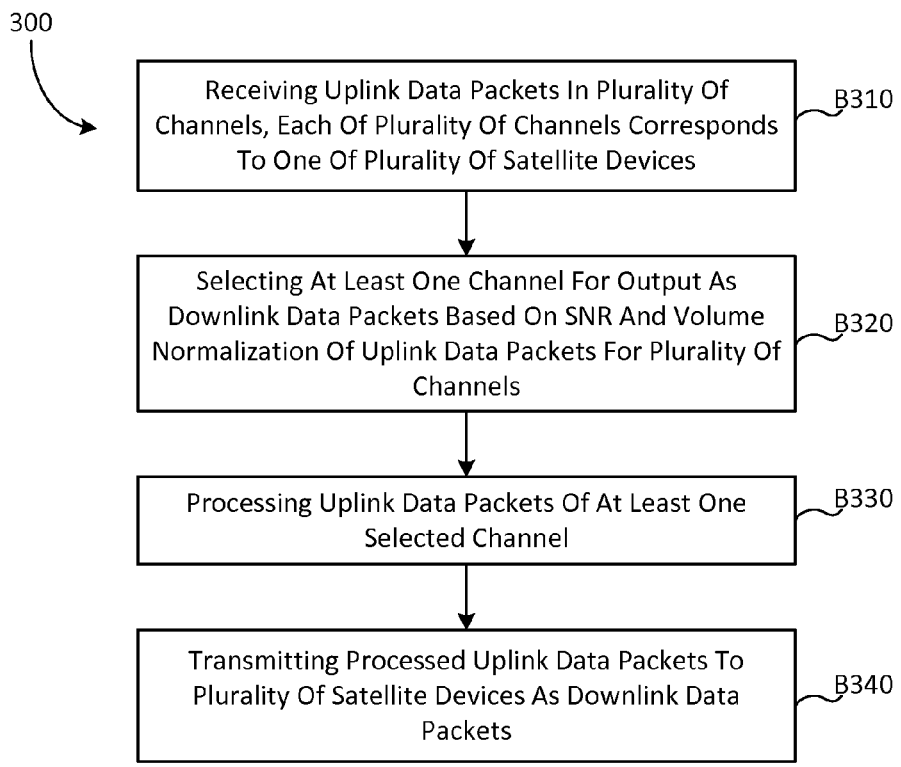
FIG. 3 is a process flowchart diagram illustrating an example of a process for conducting a virtual conference according to various embodiments.

FIG. 3 is a process flowchart diagram illustrating an example of a process 300 for processing uplink and downlink data packets in a virtual conference according to various embodiments. Referring to FIGS. 1-3, the process 300 may be implemented for the VCS 100, in which at least the master device 110 and the satellite devices 120 may be implemented with the PCD 200. The process 300 may be implemented for the master device 110.

At block B310, the master device 110 may receive uplink data packets in a plurality of channels. Each of the plurality of channels may correspond to one of the plurality of satellite devices 120. For example, the uplink data packets may be transmitted by the satellite devices 120 over the network 150.

At block B320, the master device 110 may select at least one channel for output (as downlink data packets) based on SNR and volume normalization of the uplink data packets for the plurality of channels. For example, for each of the plurality of channels sending uplink data packets to the master device 110, the master device 110 may determine at least one channel with the highest SNR. The channel with the highest SNR may be selected. The selected channel may correspond to one (e.g., satellite device 120a) of the satellite devices 120.

Volume normalization may refer to maintaining an amplitude (peak or average) of the signals of the selected channel to a predefined level. In some embodiments, the volume normalization may be applied to all of the plurality of channels before selection based on the SNR. In other embodiments, the volume normalization may be applied to the selected channel(s) after channel selection. As different microphones of different satellite devices 120 (and the master device 110) may have different sensitivities, the volume of the signals in the channels may fluctuate from channel to channel. Without proper volume normalization, output volumes may fluctuate when the channel is switched due to the selection process. Thus, the volume normalization may curb output volume fluctuation of signals at downlink (e.g., when outputted as the downlink data packets).

At block B330, the master device 110 may process the uplink data packets of the at least one channel selected. Signal processing at block B330 may refer to any other processes performed on the selected channel(s) that is not volume normalization, channel selection, and channel mixing. For example, such process may refer to echo cancellation in the manner described.

At block B340, the master device 110 may transmit the processed uplink data packets to the plurality of satellite devices as downlink data packets. In some embodiments, the master device 110 may not transmit the downlink data packets to the satellite device (e.g., the satellite device 120a) that corresponds to the selected channel. The master device 110 may send an announcement signal to the satellite device 120a to indicate that the satellite device 120a should not output the downlink data packets.

Figure 4A:
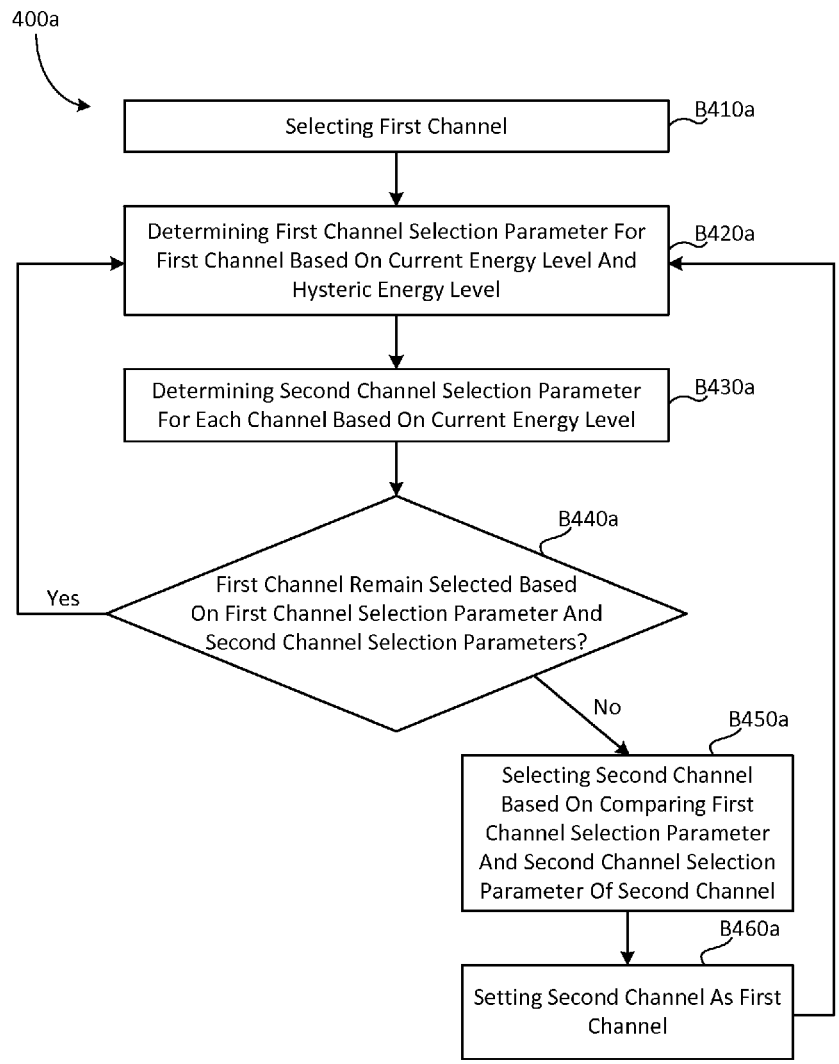
FIG. 4A is a process flowchart diagram illustrating an example of a process for channel selection in a virtual conference according to various embodiments.

FIG. 4A is a process flowchart diagram illustrating an example of a process 400a for channel selection in a virtual conference according to various embodiments. Referring to FIGS. 1-4A, the process 400a may be implemented for the VCS 100, in which at least the master device 110 and the satellite devices 120 may be implemented with the PCD 200. The process 400a may be implemented for the master device 110. The process 400a may be used as an alternative to the selection process described with respect to block B320.

At block B410a, the master device 110 may select a first channel from the plurality of channels in any suitable manner. In one non-limiting example, the master device 110 may select the first channel using the process 400a (and/or the process 400b) as described. In another non-limiting example, the master device 110 may select the first channel using the block B320 of the process 300 as described. In yet another non-limiting example, the master device 110 may select the first channel based on user input received via the user input device of the user interface device 250 of the master device 110 or one of the satellite devices 120.

Next at block B420a, the master device 110 may determine a first channel selection parameter for the first channel based on a current energy level and a hysteric energy level. That is, channel selection may factor into past energy level associated with the currently selected channel. The hysteric energy level may be weighted based on time. The weight of hysteric energy level may decrease over time. In particular embodiments, the first channel selection parameter may be a weighted or unweighted sum/average of the current energy level and the hysteric energy level. Illustrating with a non-limiting example, the first channel selection parameter (Pch) may be calculated with:

$$Pch=Wc*Ec+[Wp1*Ep1+Wp2*Ep2+ \ldots +Wpn*Epn] \quad (1)$$

where Ec may be the current energy level (e.g., the energy level associated with the current frame or window of the uplink data packet), and Wc may be the weighting factor for Ec. Wc may be use to emphasize or deemphasize the weight of Ec. For example, Wc may be 1, 2, 5, 10, 20, and the like. Ep1, Ep2, . . . Epn may be energy levels associated with uplink data packets of a first previous frame or window received immediately before the current frame or window, a second previous frame or window received immediately before the first previous frame or window, . . . , a nth previous frame or window received immediately before the (n–1)th previous frame or window.

Wp1, Wp2, . . . , and Wpn may be weighting factors assigned to each of the first previous frame, second previous frame, . . . , and nth previous frame, respectively.

In a non-limiting example, the Wp1, Wp2, . . . , and Wpn may decrease exponentially the further back in time they are received. For example, Wp1, Wp2, . . . , and Wpn may be determined by:

$$Wp1=A/B \quad (2)$$

$$Wp2=A/(B^2) \quad (3)$$

$$Wpn=A/(B^n) \quad (4)$$

In another non-limiting example, the Wp1, Wp2, . . . , and Wpn may decrease linearly the further back in time they are received. For example, Wp1, Wp2, . . . , and Wpn may be determined by:

$$Wp1=A/B \quad (5)$$

$$Wp2=A/(2*B) \quad (6)$$

$$Wpn=A/(n*B) \quad (7)$$

where both A and B are numbers greater than 0. A may be, for example, 1, 10, 100, and the like. B may be, for example, 10, 20, 50, and the like. In some embodiments, the energy level may be calculated with a Root Mean Square (RMS) of a sample in a frame/window as contained within uplink data packets.

At block B430a, the master device 110 may determine a second channel selection parameter for each channel other than the first channel based on the current energy level associated with each of the other channels. For example, the second channel selection parameter may be the current energy level. In further embodiments, the second channel selection parameter may also take into account hysteric energy levels (i.e., based on both the current energy level and the hysteric energy level) in a manner similar to described with respect to the first channel selection parameter.

At block B440a, the master device 110 may determine whether the first channel may remain selected based on the first channel selection parameter and the second channel selection parameters. In particular, the master device 110 may determine whether any one of the second channel selection parameters outweighs the first channel selection parameter by determining whether any of the second channel selection parameters crosses the threshold defined by the first channel selection parameter.

When the second channel selection parameters do not outweigh (e.g., does not exceed) the first channel selection parameter, the first channel may remain being selected such that the process repeats at block B420a (B440a: YES). On the other hand, when one of the second channel selection parameters outweighs the first channel selection parameter, the first channel may not remain as the selected channel. The master device 110 may select a second channel based on comparing the first channel selection parameter and the second channel selection parameter of the second channel, at block B450a (B440a: NO). The master device 110 may then set the second channel as the first channel at block B460a. The process then repeats at block B420a.

Figure 4B:
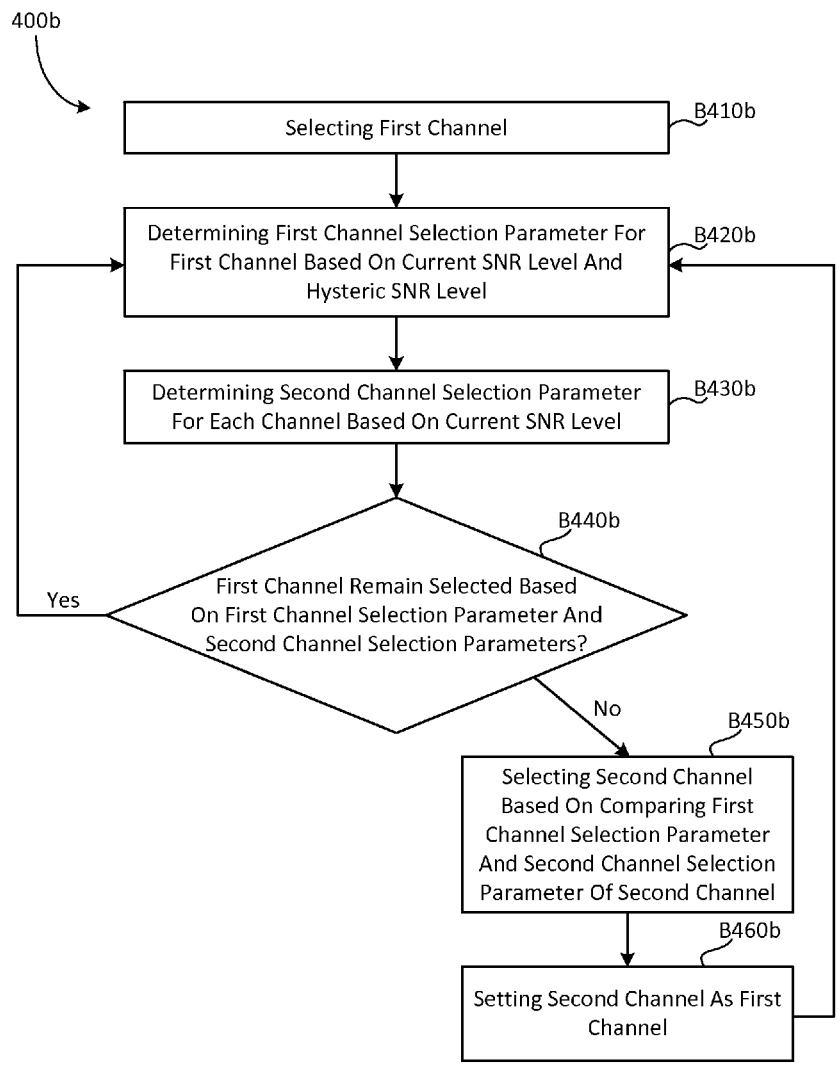
FIG. 4B is a process flowchart diagram illustrating an example of a process for channel selection in a virtual conference according to various embodiments.

FIG. 4B is a process flowchart diagram illustrating an example of a process 400b for channel selection in a virtual conference according to various embodiments. Referring to FIGS. 1-4B, the process 400b may be implemented for the VCS 100, in which at least the master device 110 and the satellite devices 120 may be implemented with the PCD 200. The process 400b may be implemented for the master device 110. The process 400b may be used as an alternative to the selection process described with respect to block B320. The process 400b may be used as an alternative to or in combination with the process 400a.

At block B410b, the master device 110 may select a first channel from the plurality of channels in any suitable manner. In one non-limiting example, the master device 110 may select the first channel using the process 400a and/or the process 400b as described. In another non-limiting example, the master device 110 may select the first channel using the block B320 of the process 300 as described. In yet another non-limiting example, the master device 110 may select the first channel based on user input received via the user input device of the user interface device 250 of the master device 110 or one of the satellite devices 120.

Next at block B420A, the master device 110 may determine a first channel selection parameter for the first channel based on a current SNR level and a hysteric SNR level. That is, channel selection may factor into past SNR level associated with the currently selected channel. The hysteric SNR level may be weighted based on time. The weight of hysteric SNR level may decrease over time. In particular embodiments, the first channel selection parameter may be a weighted or unweighted sum/average of the current SNR level and the hysteric SNR level. Illustrating with a non-limiting example, the first channel selection parameter (Pch) may be calculated with:

$$Pch = Wc*SNRc + [Wp1*SNRp1 + Wp2*SNRp2 + \ldots + Wpn+SNRpn] \quad (8)$$

where SNRc may be the current SNR level (e.g., the SNR level associated with the current frame or window of the uplink data packet), and Wc may be the weighting factor for SNRc. Wc may be use to emphasize or deemphasize the weight of SNRc. For example, Wc may be 1, 2, 5, 10, 20, and the like. SNRp1, SNRp2, . . . SNRpn may be SNR levels associated with uplink data packets of a first previous frame or window received immediately before the current frame or window, a second previous frame or window received immediately before the first previous frame or window, . . . , a nth previous frame or window received immediately before the (n−1)th previous frame or window.

Wp1, Wp2, . . . , and Wpn may be weighting factors assigned to each of the first previous frame, second previous frame, . . . , and nth previous frame, respectively.

In a non-limiting example, the Wp1, Wp2, . . . , and Wpn may decrease exponentially the further back in time they are received. For example, Wp1, Wp2, . . . , and Wpn may be determined by:

$$Wp1 = A/B \quad (9)$$

$$Wp2 = A/(B^2) \quad (10)$$

$$Wpn = A/(B^n) \quad (11)$$

In another non-limiting example, the Wp1, Wp2, . . . , and Wpn may decrease linearly the further back in time they are received. For example, Wp1, Wp2, . . . , and Wpn may be determined by:

$$Wp1 = A/B \quad (12)$$

$$Wp2 = A/(2*B) \quad (13)$$

$$Wpn = A/(n*B) \quad (14)$$

where both A and B are numbers greater than 0. A may be, for example, 1, 10, 100, and the like. B may be, for example, 10, 20, 50, and the like.

At block B430b, the master device 110 may determine a second channel selection parameter for each channel other than the first channel based on the current SNR level associated with each of the other channels. For example, the second channel selection parameter may be the current SNR level. In further embodiments, the second channel selection parameter may also take into account hysteric SNR levels (i.e., based on both the current SNR level and the hysteric SNR level) in a manner similar to described with respect to the first channel selection parameter.

At block B440b, the master device 110 may determine whether the first channel may remain selected based on the first channel selection parameter and the second channel selection parameters. In particular, the master device 110 may determine whether any one of the second channel selection parameters outweighs the first channel selection parameter by determining whether any of the second channel selection parameters crosses the threshold defined by the first channel selection parameter.

When the second channel selection parameters do not outweigh (e.g., does not exceed) the first channel selection parameter, the first channel may remain being selected such that the process repeats at block B420b (B440b: YES). On the other hand, when one of the second channel selection parameters outweighs the first channel selection parameter, the first channel may not remain as the selected channel. The master device 110 may select a second channel based on comparing the first channel selection parameter and the second channel selection parameter of the second channel, at block B450b (B440b: NO). The master device 110 may then set the second channel as the first channel at block B460b. The process then repeats at block B420b.

Therefore, it is likely that a currently selected channel may still remain selected even if its current energy and/or SNR level is not the highest. This may be due to the hysteric value terms. By using hysteric energy and/or SNR levels for the currently selected channel (as well as for other channels in further embodiments), the VCS 100 may avoid frequent and inappropriate channel switching between a currently selected channel and another channel with a momentary higher burst of energy and/or SNR. User-perceptible artifacts due to amplitude and phase discontinuity between samples of different channels may be avoided.

Figure 5:
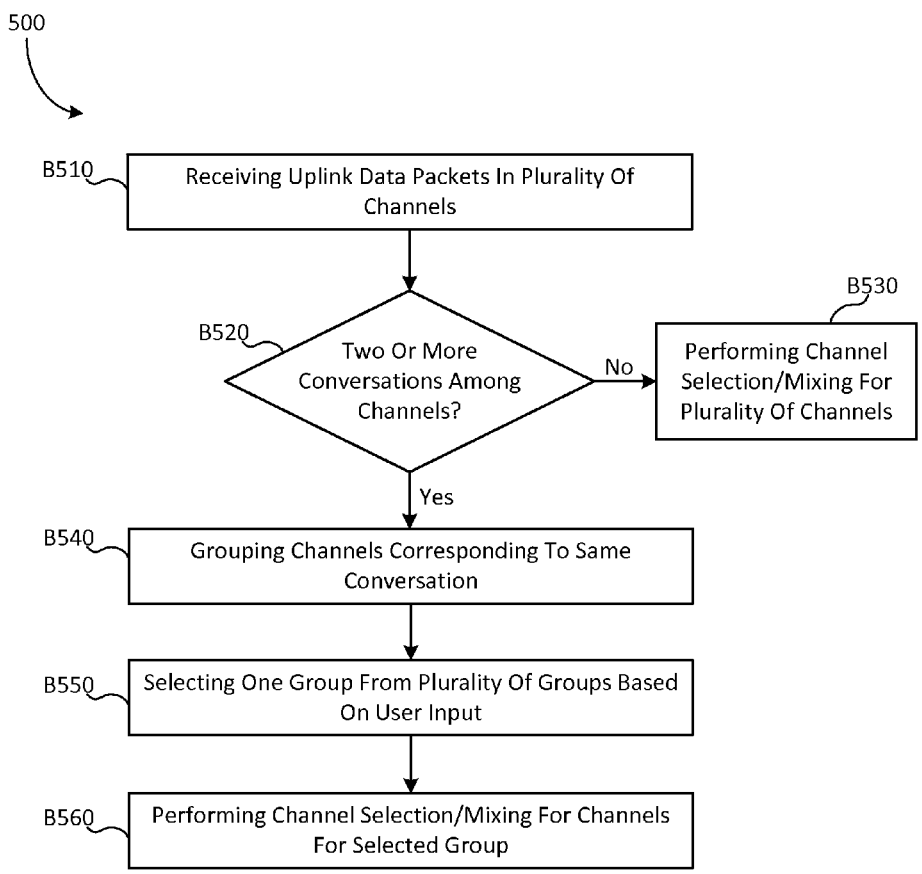
FIG. 5 is a process flowchart diagram illustrating an example of a process for conversation selection in a virtual conference according to various embodiments.

FIG. 5 is a process flowchart diagram illustrating an example of a process 500 for conversation selection in a virtual conference according to various embodiments. Referring to FIGS. 1-5, the process 500 may be implemented for the VCS 100, in which at least the master device 110 and the satellite devices 120 may be implemented with the PCD 200. The process 500 may be implemented for the master device 110. In particular, blocks B520-B550 may be intermediary blocks executed after receiving of uplink data packets (blocks B310 and B510) and before channel selection (blocks B320 and B560)

At block B510, the master device 110 may receive uplink data packets in plurality of channels in a manner similar to described with respect to block B310.

Next, the master device 110 may determine whether there are two or more conversations among the plurality of channels, at block B520. For example, the users of the satellite devices 120 and the master device 110 may be engaged in a main conversation and at least one side conversation. All of the microphones 210 of the satellite devices 120 and the master device 110 may not be able to capture all of the conversations occurring in the venue 190.

In some embodiments, the master device 110 may determine that there are more than one conversation based on predefined setting. For example, the master device 110 may receive user input related to a number (e.g., 1, 2, 3, and the like) of different conversations about to occur or is occurring via the user input device of the user interface device 250 of the master device 110. The user input may also be received via the user input device of the user interface device 250 of one of the satellite devices 120 and transmitted to the master device 110 via the network 150. A user of the master device 110 and/or one of the satellite devices 120 may indicate before or during the active session that there is one or more conversations occurring.

In other embodiments, the master device 110 (and/or at least one of the satellite devices 120) may automatically detect the presence of two or more ongoing conversations. For example, the master device 110 may compute cross-correlations for signals of two or more channels. When the master device 110 detects that there are two channels having a low cross-correlation (e.g., 20%, 10%, 5%, 1%, or the like) and a high SNR (80%, 90%, 95%, and the like), then the master device 110 may detect that there are two or more ongoing conversations. At least one of the satellite devices 120 may detect the presence of two or more ongoing conversations in a similar manner and send an indication as to whether there are two or more ongoing conversations to the master device 110.

When the master device 110 (and/or one or more of the satellite devices 120) determines that there is only one conversation among the channels, the master device 110 may perform, at block B530 (B520: NO), the channel selection and/or mixing processes for the plurality of channels in a manner similar to described with respect to B320 or the processes 400a and/or 400b.

On the other hand, when the master device 110 (and/or one or more of the satellite devices 120) determines that there are two or more conversations among the channels, the master device 110 may group the channels corresponding to a same conversation at block B540.

In some embodiments, the channels may be grouped based on physical location within the venue 190 of the corresponding satellite devices 120. In some embodiments, the location of the corresponding satellite devices 120 may be predefined, as in the case of seating in the venue 190. The satellite devices 120 may be configured to scan a Quick Response (QR) code (using a camera of the user interface device 250) or a RFID tag (using the RFID reader of the user interface device 250) attached to a fixed object such as a chair, a table, a station, or the like. The indication of seating arrangement provided within the QR code or the RFID may be transmitted by the satellite devices 120 to the master device 110. Based on the indication of seating arrangements, the master device 110 may determine the grouping of the satellite devices 120. For example, a first group of satellite devices 120 may be located within a predefined area (e.g., within 5 meters, 10 meters, 20 meters, or the like) of a speaker or a fixed location (e.g., a podium). A second group of satellite devices 120 may be located within a different predefined area.

In other embodiments, the channels may be grouped based on cross-correlations of the signals between the channels. Referring to the embodiments, where cross-correlations may be used for determining whether two or more conversations are occurring among the channels, the master device 110 may group channels with high cross-correlations (e.g., 70%, 80%, 90%, or the like) with each other (or with at least one channel having the highest SNR) together. For example, the master device 110 may determine two or more (reference) channels with highest SNR and/or low cross-correlations (e.g., 20%, 10%, 5%, 1%, or the like) with one another. The two or more (reference) channels may be assigned to different groups. Channels with high cross-correlations (at least 80%) with one of the reference channels may be grouped together with that reference channel. The reference channel may have the highest SNR in a given group.

Next at block B550, the master device 110 may select one group from the plurality of groups based on user input. For example, the master device 110 may receive user input via the user input device of the user interface device 250 regarding which one of the plurality of conversations to select. The master device 110 may display an identity or a location associated with the channel/satellite device having the highest SNR within each group to assist the user of the master device 110 in selecting the group.

At block B560, the master device 110 may perform the channel selection and mixing for the channels in the selected group in a manner similar to described with respect to block B320 or the process 400a and/or 400b. In particular embodiments, the master device 110 may directly select the channel with the highest SNR (e.g., the reference channel) in the selected group, given that it may have already been determined.

Alternatively, instead of selecting one group (at block B550) and performing channel selection/mixing (at block B560), two or more groups may be selected based on user input. In some cases, all groups may be eligible for channel selection and mixing. For example, one channel from each of two or more groups may be selected in a manner similar to described with respect to block B320 or the process 400. The selected channels may be mixed by the master device 110 and transmitted as downlink data packets to the satellite devices 120 for output.

Figure 6:
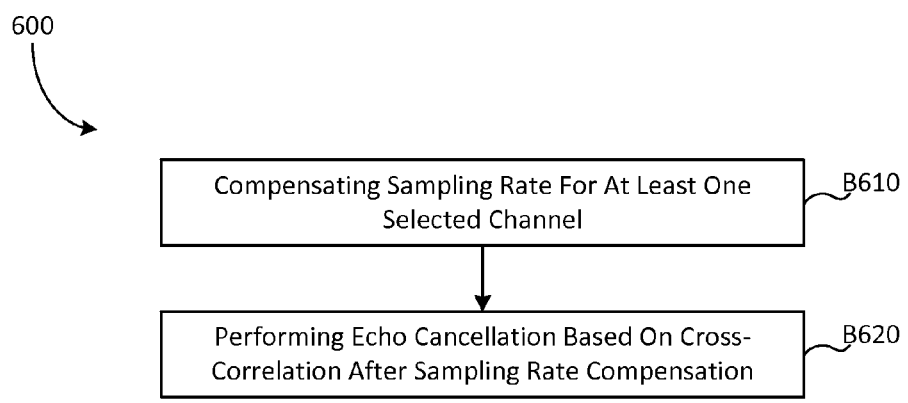
FIG. 6 is a process flowchart diagram illustrating an example of a process for echo cancellation in a virtual conference according to various embodiments.

FIG. 6 is a process flowchart diagram illustrating an example of a process 600 for echo cancellation in a virtual conference according to various embodiments. Referring to FIGS. 1-6, the process 600 may be implemented for the VCS 100, in which at least the master device 110 and the satellite devices 120 may be implemented with the PCD 200. The process 600 may be implemented for the master device 110. In particular, the process 600 may be at least a part of the uplink data packets processing at block B330.

Echo may refer to the audio signals outputted by the satellite devices 120 and the master device 110 that have been captured by the microphone 210 of at least one of the satellite device 120 and the master device 110. To prevent the recaptured signal from being outputted again, the master device 110 (and/or the satellite devices 120) may determine that a portion of the captured signals (uplink data packets) is echo by determining the cross-correlation between the captured signals and a reference signal. The reference signal may be previous signals in the downlink data packets transmitted by the master device 110 to the satellite devices 120 for output. The reference signal may be stored in the memory unit 230 of the master device 110.

The clock speed may be different for each channel/satellite device. Therefore, the master device 110 may compensate for the sampling rate (clock skew handling) for the selected channel before determining the cross-correlation with the reference signal.

At block B610, the master device 110 may compensate sampling rate for the at least one selected channel. Given that only the signals from the selected channel may be outputted by the satellite devices 120 and the master device 110, echo cancellation may only need to be applied to the selected channel. The master device 110 may handle the clock skew caused by different clock speed of the satellite device corresponding to the selected channel by conforming the sampling rate of the selected channel with a sample rate of the master device 110.

At block B620, the master device 110 may perform echo cancellation based on a cross-correlation with the reference signal after sampling rate compensation.

Figure 7:
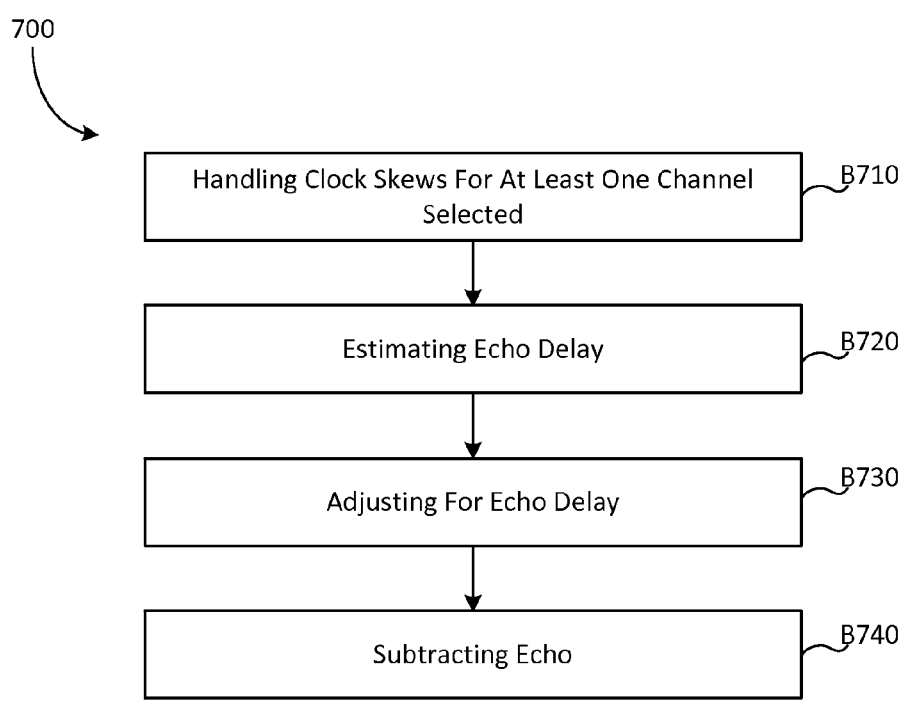
FIG. 7 is a process flowchart diagram illustrating an example of a process for echo cancellation in a virtual conference according to various embodiments.

FIG. 7 is a process flowchart diagram illustrating an example of a process 700 for echo cancellation in a virtual conference according to various embodiments. Referring to FIGS. 1-7, the process 700 may be implemented for the VCS 100, in which at least the master device 110 and the satellite devices 120 may be implemented with the PCD 200. The process 700 may be implemented for the master device 110. In particular, the process 700 may correspond to one or more blocks of the process 600. For example, block B710 may correspond to block B610. Blocks B720-B740 may correspond to block B620.

At block B710, the master 110 device may handle clock skews for the at least one channel selected in a manner similar to described with respect to block B610. At block B720, the master device 110 may an estimate echo delay. For example, the master device 110 may determine the cross-correlation between the current signals from the selected channel and the reference signal. When the cross-correlation is above a predetermined threshold, the master device 110 may detect the presence of the echo. The echo delay may be noted by the master device 110.

At block B730, the master device 110 may adjust the reference signals or the received signals by time shifting using the echo delay, for alignment. At block B740, the master device 110 may subtract the reference signals from the received signals in the uplink data packets.

Though processes 600 and 700 are described herein with respect to the master device 110, one of ordinary skill in the art can appreciate that the processes 600 and 700 may likewise be implemented for the satellite devices. For example, the reference signals may be stored in the satellite devices 120 such that echo cancellation may be performed locally by the satellite devices 120.

Figure 8:
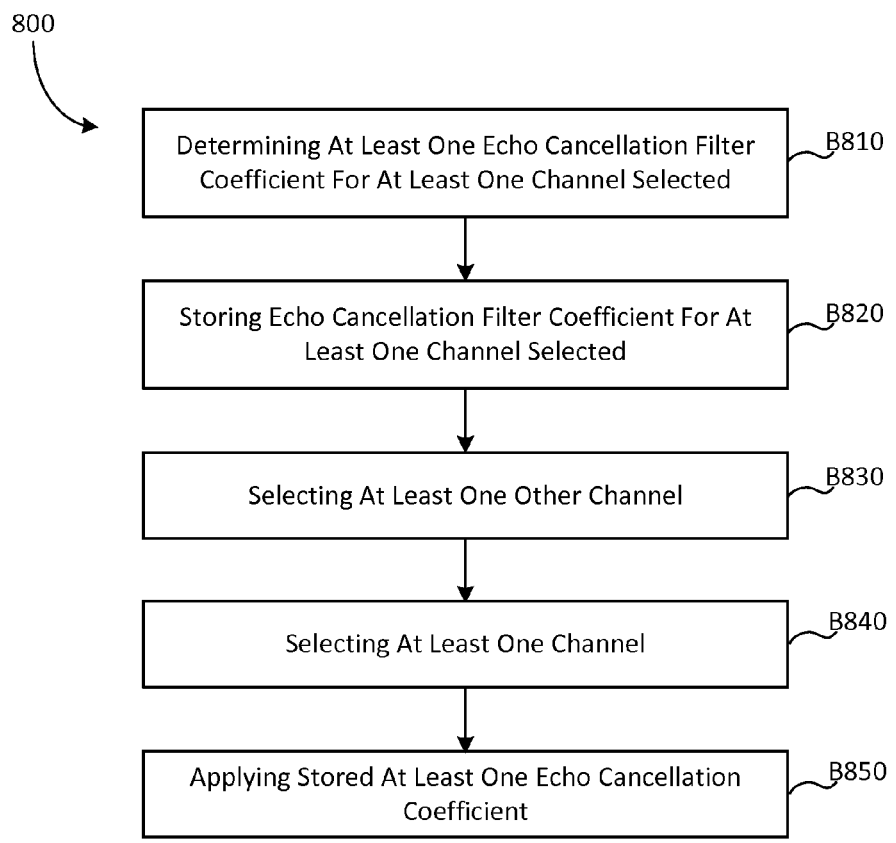
FIG. 8 is a process flowchart diagram illustrating an example of a process for echo cancellation in a virtual conference according to various embodiments.

FIG. 8 is a process flowchart diagram illustrating an example of a process 800 for echo cancellation in a virtual conference according to various embodiments. Referring to FIGS. 1-8, the process 800 may be implemented for the VCS 100, in which at least the master device 110 and the satellite devices 120 may be implemented with the PCD 200. The process 800 may be implemented for the master device 110. In particular, the process 800 may be at least a part of the uplink data packets processing at block B330.

At block B810, the master device 110 may determine at least one echo cancellation filter coefficient for the at least one channel selected (a first channel). The master device 110 may store the at least one echo cancellation filter coefficient for the at least one channel selected (in the memory unit 230). The at least one echo cancellation filter coefficient may not have been stored previously (i.e., the current channel selected is the first time being selected in a particular active conferencing session). In particular, the memory unit 230 may include a mapping table that maps at least some of the channels (including the currently selected channel) with a set of echo cancellation filter coefficients previously determined.

At block B830, the master device 110 may select at least one other channel (second channels) using one or more of processes 300, 400a, 400b, or 500. At block B840, the at least one selected channel (the first channel) may be reselected using one or more of processes 300, 400a, 400b, or 500. At block B850, the master device 110 may apply the stored at least one echo cancellation coefficient, instead of re-determining the at least one echo cancellation coefficient.

Accordingly, a filter convergence time and an amount of initial echo may be reduced by applying previously determined filter parameters rather than re-determining, which may cost consume additional time right after channel switch.

In some embodiments, the echo cancellation may be executed entirely at the master device 110. In some embodiments, the echo cancellation may be executed entirely at each of the satellite devices 120 locally, without any facilitation by the master device. Alternatively, a hybrid mechanism may be used for echo cancellation.

Figure 9:
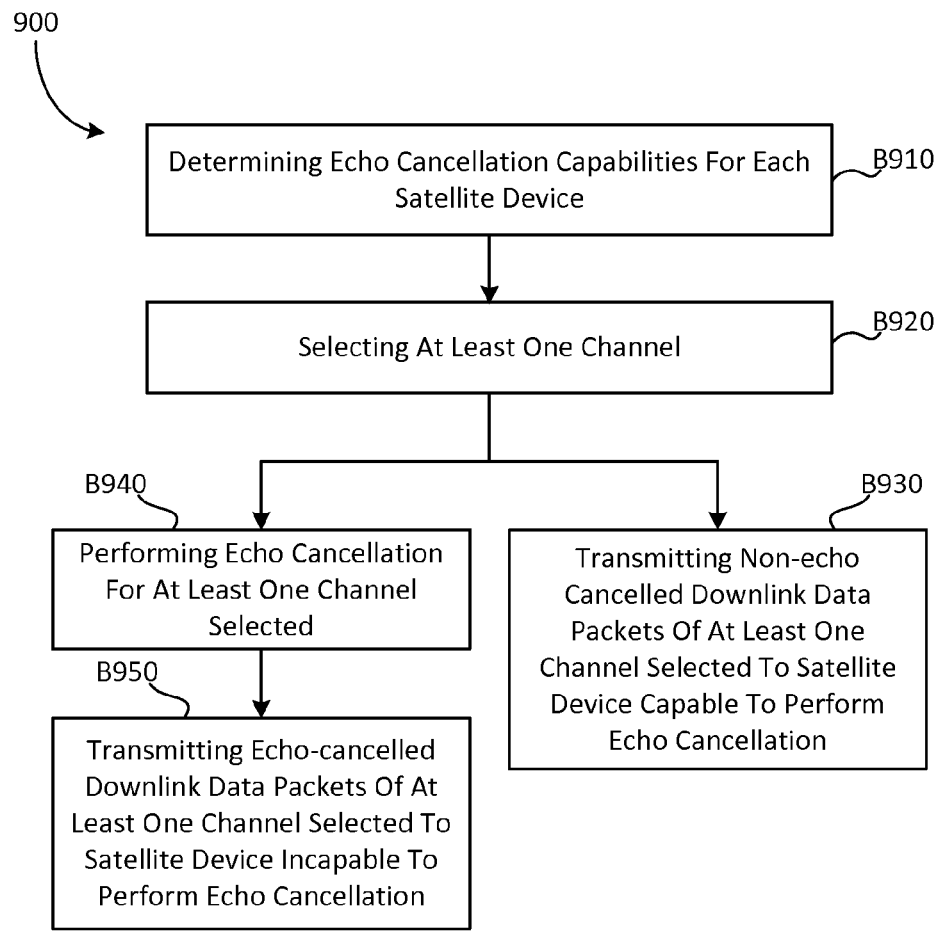
FIG. 9 is a process flowchart diagram illustrating an example of a process for echo cancellation in a virtual conference according to various embodiments.

FIG. 9 is a process flowchart diagram illustrating an example of a process 900 for echo cancellation in a virtual conference according to various embodiments. Referring to FIGS. 1-9, the process 900 may be implemented for the VCS 100, in which at least the master device 110 and the satellite devices 120 may be implemented with the PCD 200. The process 900 may be implemented for the master device 110. In particular, the process 900 may be at least a part of the uplink data packets processing at block B330.

At block B910, the master device 110 may determine echo cancellation capabilities for each of the satellite devices 120. The master device 110 may send a request to each of the satellite devices 120 during peer discovery, requesting the satellite devices 120 to indicate capabilities of performing echo cancellation. The master device 110 may then receive responses from each of the satellite devices 120 indicating whether each of the satellite devices 120 is capable of performing local echo cancellation.

At block B920, at least one channel is selected by the master device 110 in a manner similar to described with respect to blocks B320 and the processes 400a and/or 400b. At block B930, the master device 110 may transmit non-echo cancelled downlink data packets originating from the at least one channel selected to a satellite device that is capable to perform local echo cancellation. The master device 110 may transmit the non-echo cancelled downlink data packets to the capable satellite devices based on the responses received. In this case, the non-echo cancelled downlink signals may include uplink signals (hence the echo).

At block B930, the master device 110 may perform echo cancellation for the at least one channel selected in a manner similar to described with respect at least one of the processes 600, 700, and/or 800. At block B940, the master device 110 may transmit the echo-cancelled downlink data packets originating from the at least one channel selected to the satellite devices that may be incapable to perform local echo cancellation.

Figure 10:
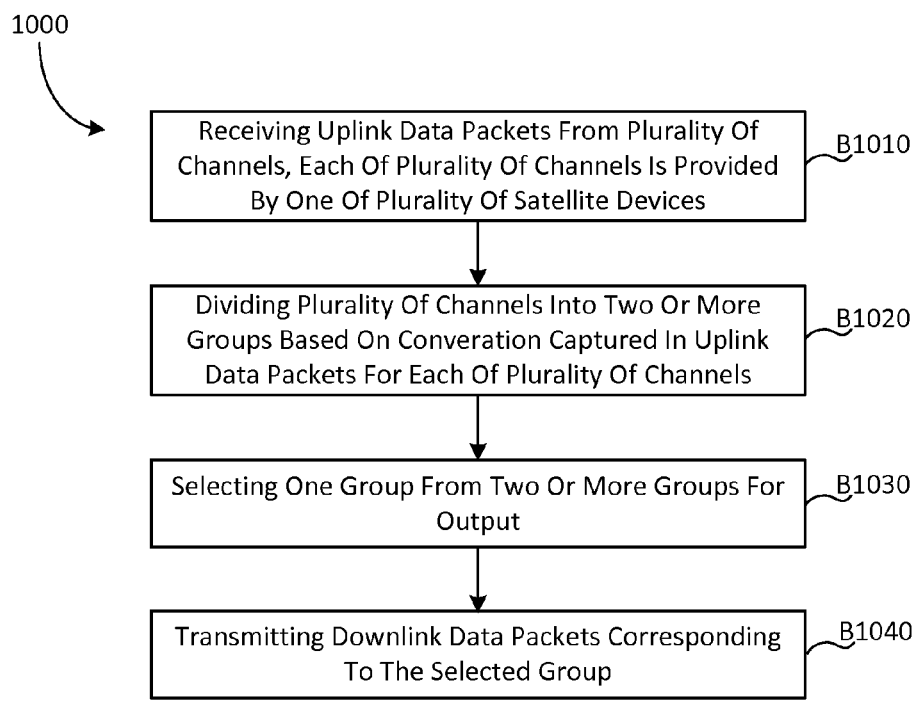
FIG. 10 is a process flowchart diagram illustrating an example of a process for providing a virtual conference according to various embodiments.

FIG. 10 is a process flowchart diagram illustrating an example of a process 1000 for providing a virtual conference according to various embodiments. Referring to FIGS. 1-10, the process 1000 may be implemented for the VCS 100, in which at least the master device 110 and the satellite devices 120 may be implemented with the PCD 200. The process 1000 may be implemented for the master device 110.

At block B1010, the master device 110 may receive the uplink data packets from the plurality of channels. Each of the plurality of channels is associated with one of the plurality of satellite devices 120. At block B1020, the master device may divide the plurality of channels into two or more groups based on a conversation captured in the uplink data packets of each of the plurality of channels. At block B1030, the master device may selecting one group from the two or more groups for output. At block B1040, the master device may transmit downlink data packets corresponding to the selected group to the satellite devices.

As referred to herein, uplink data packets, downlink data packets, data packets, frames, and the like may refer to any type of audio packets/frames or video packets/frames used for the VCS 100.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general purpose processor, a DSP, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Various modifications to embodiments described herein will be readily apparent to those skilled in the art, and the generic principles defined herein may be applied to some embodiments without departing from the spirit or scope of the disclosure. Thus, the present disclosure is not intended to be limited to the embodiments shown herein but is to be accorded the widest scope consistent with the following claims and the principles and novel features described herein.

What is claimed is:

1. A method for providing a virtual conference with a master device connected to a plurality of satellite devices, comprising:
   receiving, by the master device, uplink data packets from a plurality of channels, each of the plurality of channels is associated with one of the plurality of satellite devices;
   dividing, by the master device, the plurality of channels into two or more groups based on a conversation captured in the uplink data packets of each of the plurality of channels and cross-correlation between the plurality of channels, wherein channels with cross-correlation above a threshold are grouped into a same group;
   selecting, by the master device, one group from the two or more groups for output; and
   transmitting, by the master device, downlink data packets corresponding to the selected group to the plurality of satellite devices.

2. The method of claim 1, wherein each of the master device and the plurality of satellite devices is implemented with a personal communication device (PCD).

3. The method of claim 1, wherein dividing the plurality of channels into two or more groups comprises:
   designating a first channel capturing a first conversation in a first group; and
   designating a second channel capturing a second conversation in a second group.

4. The method of claim 1, further comprising determining whether two or more conversations are being captured in the plurality of channels.

5. The method of claim 4, wherein determining whether two or more conversations are being captured in the plurality of channels comprises receiving user input indicating whether two or more conversations are being captured.

6. The method of claim 1, wherein dividing the plurality of channels into two or more groups comprises dividing the plurality of channels based on physical locations of the satellite devices providing the plurality of channels.

7. The method of claim 6, wherein the physical locations of the satellite devices may be determined by receiving an indication from the satellite devices indicating the physical locations of the satellite devices.

8. The method of claim 1, wherein each of the channels in a same group is cross-correlated with a reference channel at least above a predetermined threshold, the reference channel having the highest Signal-to-Noise Ratio (SNR) among the channels in the same group.

9. The method of claim 1, wherein selecting the one group from the two or more groups for output comprises:
   receiving user input related to selecting the one group; and
   selecting the one group based on the user input.

10. The method of claim 1, wherein dividing the plurality of channels into two or more groups based on cross-correlation between the plurality of channels comprises determining that there are two or more conversations in response to determining that:
   two of the plurality of channels have cross-correlation below a first threshold; and
   the two of the plurality of channels have a SNR higher than a second threshold.

11. The method of claim 1, further comprising:
selecting one channel from the selected one group; and
processing the uplink data packets in the selected channel, wherein the downlink data packets correspond to the processed uplink data packets in the selected channel.

12. The method of claim 11, wherein the channel is selected from the selected group based on Signal-to-Noise Ratio (SNR) associated with all channels in the selected one group.

13. The method of claim 12, wherein the channel selected is a reference channel having the highest SNR among all the channels in the same group.

14. The method of claim 11, wherein:
the channel is selected based on a current energy level and a hysteric energy level.

15. The method of claim 14, wherein the hysteric energy level is determined based on energy level of the channel selected over a predetermine time interval before a current time.

16. The method of claim 14, wherein selecting the channel based on the current energy level and the hysteric energy level comprises:
determining a first channel selection parameter for the channel based on the current energy level and the hysteric energy level;
determining a second channel selection parameter for other channels in the same group based on the current energy level; and
selecting the channel based on a comparison between the first channel selection parameter and the second channel selection parameters.

17. The method of claim 16, wherein an impact of the hysteric energy level on the first channel selection parameter decreases exponentially or linearly over time.

18. The method of claim 11, wherein:
the channel is selected based on a current Signal-to-Noise Ratio (SNR) level and a hysteric SNR level.

19. The method of claim 11, further comprising compensating, by the master device, sampling rate for echo cancellation for the selected channel before performing the echo cancellation.

20. The method of claim 11, further comprising:
determining, by the master device, at least one echo cancellation filter coefficient for the channel selected;
storing, by the master device, the at least one echo cancellation filter coefficient; and
applying the at least one echo cancellation filter coefficient for the channel selected when the channel selected is selected again.

21. The method of claim 11, further comprising:
determining, by the master device, echo cancellation capabilities for each of the plurality of satellite devices;
performing, by the master device, echo cancellation for the selected channel; and
transmitting the echo-cancelled downlink data packets to satellite devices incapable of performing echo cancellation.

22. The method of claim 21, further comprising transmitting the downlink data packets without echo cancellation to satellite devices capable of performing echo cancellation.

23. The method of claim 21, wherein the master device determines the echo cancellation capabilities for each of the plurality of satellite devices based on indications from each of the plurality of satellite devices concerning whether each of the plurality of satellite devices is capable of echo cancellation.

24. A system for providing a virtual conference, comprising:
a memory; and
a processor configured to:
receive uplink data packets from a plurality of channels, each of the plurality of channels is associated with one of the plurality of satellite devices;
divide the plurality of channels into two or more groups based on a conversation captured in the uplink data packets of each of the plurality of channels and cross-correlation between the plurality of channels, wherein channels with cross-correlation above a threshold are grouped into a same group;
select one group from the two or more groups for output; and
transmit downlink data packets corresponding to the selected group.

25. The system of claim 24, wherein the process is further configured to:
select one channel from the selected one group; and
process the uplink data packets in the selected channel, wherein the downlink data packets correspond to the processed uplink data packets in the selected channel.

26. A system for providing a virtual conference, comprising:
means for receiving uplink data packets from a plurality of channels, each of the plurality of channels is associated with one of the plurality of satellite devices;
means for dividing the plurality of channels into two or more groups based on a conversation captured in the uplink data packets of each of the plurality of channels and cross-correlation between the plurality of channels, such that each of the two or more groups is associated with a different conversation than that of another one of the two or more groups, and channels with cross-correlation above a threshold are grouped into a same group;
means for selecting one group from the two or more groups for output; and
means for transmitting downlink data packets corresponding to the selected group.

27. The system of claim 26, further comprising:
means for selecting one channel from the selected one group; and
means for processing the uplink data packets in the selected channel, wherein the downlink data packets correspond to the processed uplink data packets in the selected channel.

28. A non-transitory computer-readable medium having computer-readable instructions such that, when executed by a processor of a master device implemented with a personal communication device (PCD), cause the processor to perform a process for providing a virtual conference, comprising:
receiving uplink data packets from a plurality of channels, each of the plurality of channels is associated with one of the plurality of satellite devices;
dividing the plurality of channels into two or more groups based on a conversation captured in the uplink data packets of each of the plurality of channels and cross-correlation between the plurality of channels, wherein channels with cross-correlation above a threshold are grouped into a same group;
selecting, by the master device, one group from the two or more groups for output; and
transmitting, by the master device, downlink data packets corresponding to the selected group.

29. The non-transitory computer-readable medium of claim 28, the process further comprising:
   select one channel from the selected one group; and
   process the uplink data packets in the selected channel, wherein the downlink data packets correspond to the processed uplink data packets in the selected channel.

30. The non-transitory computer-readable medium of claim 29, wherein the channel is selected from the selected group based on Signal-to-Noise Ratio (SNR) associated with all channels in the selected one group.

* * * * *